United States Patent [19]

Houssian et al.

[11] Patent Number: 4,564,414

[45] Date of Patent: Jan. 14, 1986

[54] MAGNETIC DEVICES, APPARATUS FOR USE IN CONNECTION WITH DRY TRANSFER SHEETS INCORPORATING SUCH DEVICES AND SHEETS FOR USE THEREIN

[75] Inventors: Vazgen Houssian, Union City; Martin E. Dowzall, Wycoff, both of N.J.

[73] Assignee: Esselte Pendaflex Corporation, Garden City, N.Y.

[21] Appl. No.: 493,801

[22] Filed: May 17, 1983

[30] Foreign Application Priority Data

May 21, 1982 [GB] United Kingdom ................. 8214904

[51] Int. Cl.[4] ............................................... G09B 15/06

[52] U.S. Cl. .................................... 156/541; 156/230; 156/240; 33/430; 33/477; 40/341; 269/8; 269/48; 269/902; 402/68; 402/503

[58] Field of Search ................................ 156/540-541, 156/230, 240; 269/8, 48, 87, 87.2, 87.3, 276, 902; 33/430, 432, 434, 445, 477-478; 400/118; 40/341, 621; 402/68, 503

[56] References Cited

U.S. PATENT DOCUMENTS

| | | | |
|---|---|---|---|
| 1,351,534 | 8/1920 | Perdue | 33/445 |
| 2,662,353 | 12/1953 | Bergman et al. | 40/621 |
| 3,188,740 | 6/1965 | Brewer | 33/430 |
| 3,358,693 | 12/1967 | Brechner | 402/503 |
| 3,803,729 | 4/1974 | Acerra | 156/230 |
| 3,965,476 | 6/1976 | Wenander et al. | 400/118 |
| 4,118,128 | 10/1978 | Van den Essen | 400/118 |
| 4,232,452 | 11/1980 | Dowzall et al. | 156/541 |

FOREIGN PATENT DOCUMENTS

| | | | |
|---|---|---|---|
| 0673582 | 11/1963 | Canada | 402/503 |

*Primary Examiner*—David Simmons
*Assistant Examiner*—Merrell C. Cashion
*Attorney, Agent, or Firm*—Darby & Darby

[57] ABSTRACT

Magnetic devices are described which include a sheet of magnetic material having a relieved groove/ridge configuration, all the grooves and ridges being straight and parallel, and evenly spaced apart. Such devices can form part of apparatus for use in connection with a dry transfer sheet in assisting setting out a correctly spaced and aligned legend on a desired receptor surface. The apparatus can comprise a base member which, e.g. may be attachable to a designed receptor surface and a sheet-holder member. The sheet-holder member can consist of a bar to which a sheet of dry transfer material may be attached. One side of the bar of the sheet-holder member has a rib which may engage in the base member in one of the parallel grooves therein. The lateral spacing of the parallel grooves and the vertical spacing of lines of letters on the dry transfer sheet correspond to ensure accurate horizontal alignment of letters transferred from different rows on the transfer sheet to the final receptor. Convenient transfer sheet layouts are described.

12 Claims, 14 Drawing Figures

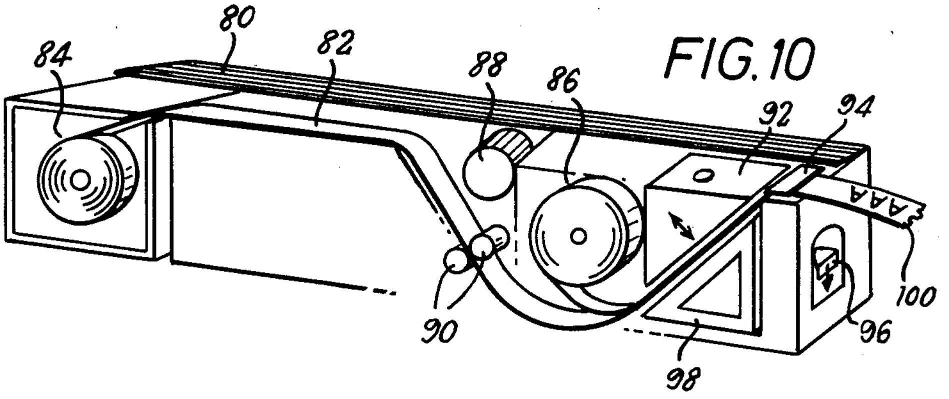
FIG. 10
FIG. 11
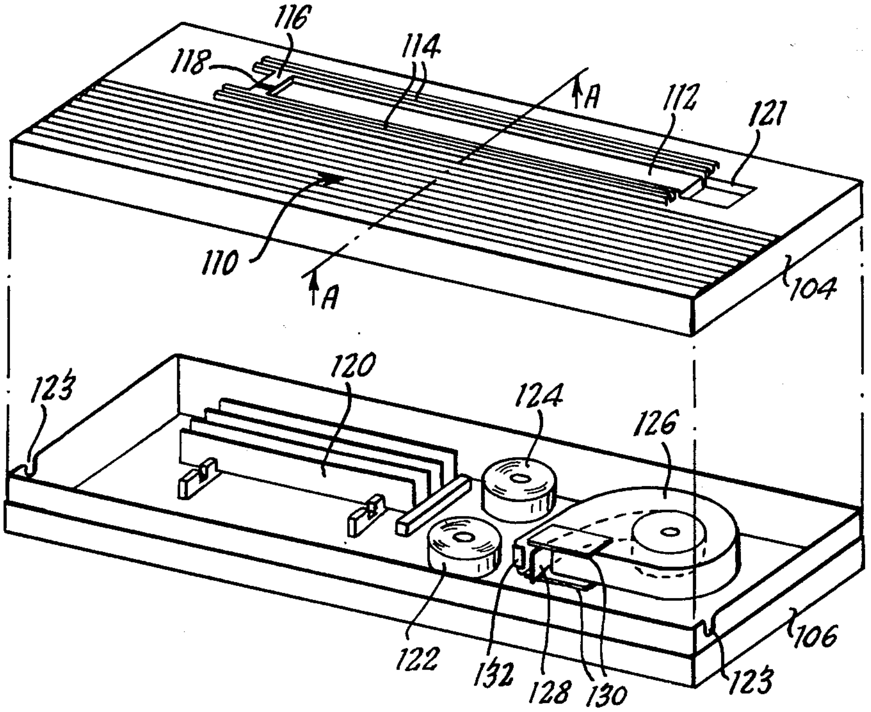

MAGNETIC DEVICES, APPARATUS FOR USE IN CONNECTION WITH DRY TRANSFER SHEETS INCORPORATING SUCH DEVICES AND SHEETS FOR USE THEREIN

This invention relates to apparatus for use in connection with dry transfer sheets, and sheets for use therein.

It has long been realized that the production of text of satisfactory appearance by the sequential laying down of letters from a dry transfer sheet requires a certain degree of skill. In particular, the eye is very quick to detect if the letters are not properly horizontally aligned. One simple approach to the problem is to start by drawing a guide line on the desired receptor surface. This is, of course, not always possible or easy, particularly if the receptor surface is for example glass or a glossy plastics surface. In addition, the line subsequently has to be removed and that operation must be carried out without damage to the transferred letters.

The simplest approach to securing horizontal letter alignment is clearly to use a suitable straight edge such as a ruler. Used with mechanical indicia applying means, this requires some sophistication but devices for horizontal alignment e.g. using hand printing blocks have been known for decades. U.S. Pat. No. 548,226 is typical. When using indicia carriers containing a plurality of indicia which are selectively sequentially applied to an underlying material, the technique is known of setting the indicia in lines regularly spaced on the indicia carrier having the carrier movable into one of a plurality of positions to bring a respective line into the desired position. Arrangements of this nature are disclosed as applied to hand drawing stencils in German Offenlegungsschrift No. 2020423 and as applied to photosetting masters in U.S. Pat. No. 4,213,680.

Applied to dry transfer sheets, the approach has been cumbersome or inconvenient to use. Thus British Patent Specification No. 2007154, U.S. Pat. Nos. 4,232,452 and 4,342,155 all disclose drawing board types of apparatus in which a sheet of dry transfer can be mounted on a suitable mounting head and moved vertically up and down and laterally across a baseboard. The vertical movement is divided stepwise and the letters or other indicia on the dry transfer sheet are printed in rows with a spacing which corresponds to the stepped vertical movement of the sheet mounting so that accurate horizontal alignment can be obtained. While such apparatus gives adequate results in studio conditions, it is wholly unsuitable for use "in the field" and inflexible in its operation.

An alternative approach which has been suggested is to mount the dry transfer material in a frame so that it constitutes a window. U.S. Pat. No. 3,803,729 discloses a system of this sort using pin register to achieve horizontal alignment. An earlier disclosure, German Offenlegungsschrift No. 2345657, likewise proposes setting a dry transfer sheet in a frame which is then moved on a drawing board to the desired position. The latter specification does not disclose any correlation between the line spacing of the indicia on the transfer sheet and any stepped spacing on the frame holder, however.

One of the major problems with the various apparatus described above is complexity both in manufacture and use. The manufacture of pin register, detent or magnetic indexing systems such as that described at page 1 lines 106 to 124 of British Specification No. 2007154 requires substantial investment and manufacturing skill.

We have now found that by appropriate use of a simple magnetic and mechanical system, a variety of easy to use apparatus may be developed which gives the desired horizontal alignment without or with only minimal retention of the disadvantages referred to above.

GENERAL STATEMENT OF THE INVENTION

In its broadest aspect, the present invention provides a novel magnetic material consisting of or comprising a sheet of rubbery or plastics material filled with magnetic particles, the particles being magnetized in such a way that at least one side of the sheet is permanently, magnetically attractive, and which is formed on that side with a relief formation of equally spaced apart, successive rectilinear ridges and valleys, each parallel to the rest.

Such a material can be used, as will be seen below, to form the basis of a variety of spacing systems which are useful, inter alia, in connection with dry transfer sheets. Flat sheet materials of this type, without the relief formation, are known and widely used, e.g., in magnetic door seals for refrigerators. The materials of the invention can be made by thermoforming one face of such material, or may be made using alternate techniques, e.g., by extrusion molding.

Preferably, the ridges and valleys are coated with a low-friction surface coating. Preferably, the valleys are upwardly pointed relatively V-shape in cross section and the ridges relatively rounded in cross section.

In order to take best advantage of the multipositioning function of such materials, they need to be dimensionally stable. Rubbery or plastics sheets may be rendered more dimensionally stable by laminating them to a stable base sheet, e. g., a sheet of steel.

The invention further includes a magnetic multiposition assembly consisting of a magnetic device of the type noted above, and a fermomagnetic member having a flat surface bearing at least one raised rib. The flat surface with the rib can be engaged on the magnetic device at any one of a plurality of positions, with the rib engaged and held magnetically in one of the valleys. The positions are all parallel to one another. By suitable choice of rib and valley dimensions, the lateral positioning of the fermomagnetic member does not vary even if the rib and/or the surface of the magnetic device wear down.

Such a multiposition device may form the basis of a horizontal alignment system. According specifically to the present invention there is provided apparatus for use in connection with a dry transfer sheet which consists of a base member and a sheet-holder member, the sheet-holder member being in the form of an elongated bar having means on one side for attaching a sheet of dry transfer material thereto and its other side being substantially flat and having a rib projecting therefrom and running along the length of the bar, the base member having a series of evenly spaced parallel grooves therein, the longitudinal extent of the grooves being at least as long as the bar, the two members being magnetically attractable one to the other, one at least of them being permanently magnetized. Preferably, the base member is a magnetic device as described above.

Such apparatus may be designed in a number of ways dependent upon the desired end use. For example, the apparatus may be in the form of a roller, like a typewriter roller, for supporting a sheet of paper connected to a support panel extending from one side of the roller, the plane of the surface of the support panel being tangential to the roller, and the base member of the apparatus of the invention being formed as, or set into, the support panel with its grooves running parallel to the axis of the roller. The transfer sheet holder with a transfer sheet extending from one side thereof is then positioned with its rib in one of the grooves so that a desired line of characters is on top of a sheet of paper extending around the roller.

In an alternative, the base member may be a relatively flexible sheet of magnetized rubbery material which may be temporarily attached to a surface on to which it is desired to transfer a legend. Thus for marking vehicle or furniture panels made of steel, whether covered with cellulosic lacquer, a paint, or not covered at all, the base member may simply be positioned on the panel, by virtue of being magnetic on its ungrooved side as well as on its grooved side, and the transfer sheet holder then attached thereto and moved in the desired way in order to assemble the desired legend on one side of the base member. Alternatively, the base member may be provided on its ungrooved side with a permanently tacky adhesive layer which will serve temporarily to attach the base member to a desired surface, the surface naturally being one which will not be damaged when the base member is peeled away after the legend has been transferred.

The transfer sheet-holder member may have any convenient transfer sheet-holding means thereon. The preferred construction is a plurality of register pins set on the bar over which a pre-punched dry transfer sheet is fitted; such a holder is denoted a pin bar herein for simplicity of expression. Magnetic clamps as described in British Patent Specification No. 2,013,573 may also be used.

It is naturally desirable to provide that the transfer-holding member, e.g. a pin bar, can slide in the direction of the grooves in the base member without difficulty. In a particularly preferred embodiment, this is achieved by facing the surface of the base member with a sheet of relatively low friction material. The material of particular value has been found to be siliconized polyethylene terephthalate sheet. When the base member is made of magnetic material filled rubbery sheet, it is conveniently manufactured by taking the ungrooved sheet (which is available as a normal article of commerce) and applying a sheet of siliconized polyethylene terephthalate thereto under heat and pressure between two pressing dies, the die adjacent the siliconized sheet having a plurality of ribs on its face which deforms the material of the sheets during pressing and hot lamination to provide the desired grooves.

Dry transfer sheets for use with the apparatus of the present invention must have successive lines of letters, symbols or the like spaced from one another correspondingly to the spacing of the grooves on the base member. A particularly convenient sheet format is that of a sheet which is wider than it is tall, the sheet width corresponding to the length of the elongate pin bar, and the dry transfer symbols on the sheet being in two groups separated by a transverse strip running across the middle of the sheet, which strip has register apertures punched in it for registration with the register pins on the elongate pin bar. The central strip borders the bottom line in each group of transferable symbols when this is viewed the right way up.

As noted above, the apparatus of the present invention may take a wide variety of forms, and in particular the base member may be anything from a simple rectangular panel having a set of parallel grooves in it and means for affixing it to a desired surface temporarily, to substantial apparatus in the form of a drawing board or the like having a grooved surface section with appropriate alignment means for a receptor sheet and optionally including storage means for the pin bar or the like and for a plurality of dry transfer sheets. In a more complex apparatus of the latter type, means may be provided for holding in position in the apparatus specific receptor materials for particular purposes. In particular, the apparatus of the present invention may be adapted for carrying out the word alignment process described in European Patent Application No. 0058066. A suitable such adaptation is the provision of means for locating in the surface of the apparatus a strip of intermediate receptor material and that intermediate receptor material may be in the form of a sheet or strip or in the form of a long strip which may be unreeled e.g. from a reel of such material located laterally of the main part of the apparatus. Indeed if desired the apparatus may include other features to assist in carrying out the word positioning method described in that European Specification. For example, it may include means for storing a strip of adhesive web material, means for leading the adhesive web and the strip of intermediate receptor material together along a common path, means for treating the intermediate receptor material at a station along that common path with a liquid and means for cutting off a section of the strips of intermediate receptor material and adhesive web material.

Alternatively, the apparatus of the invention may include a base unit having a section of material which itself acts as an intermediate receptor and which may be detached from the base so that once a legend has been accurately applied thereto, the support may be removed, the legend removed therefrom with e.g. highly tacky pressure sensitive adhesive tape, and a section of the tape then stuck down where desired, the section of the tape serving as a printed label with the printing underneath the tape i.e. protected from abrasion by the tape.

An alternative embodiment of the present invention relies on magnetic attraction between a base sheet consisting of a magnetic device as described above backed with a magnetic sheet steel backing, and a permanently magnetized surface, onto which the magnetic device may be held by magnetic attraction. The surface may be a magnetic panel dimensioned to fit over or constituting the entire drawing surface of a drawing board. A panel of vinyl covered magnetized rubbery material gives the drawing board a magnetic surface onto which apparatus of the invention as described above may be held and then used without difficulty. In particular, the apparatus of the invention may be magnetically held against the drawing board at any desired position on a drawing over the board. This can be particularly valuable for labelling e.g. architectural drawings and engineering plans using dry transfer lettering.

The invention is illustrated by way of example with reference to the accompanying drawings in which:

FIG. 10 is a view of apparatus adapted for use in the process described in the European Patent Specification No. 0058066, FIG. 11 is a view of apparatus suited for labelmaking.

Figure 1:
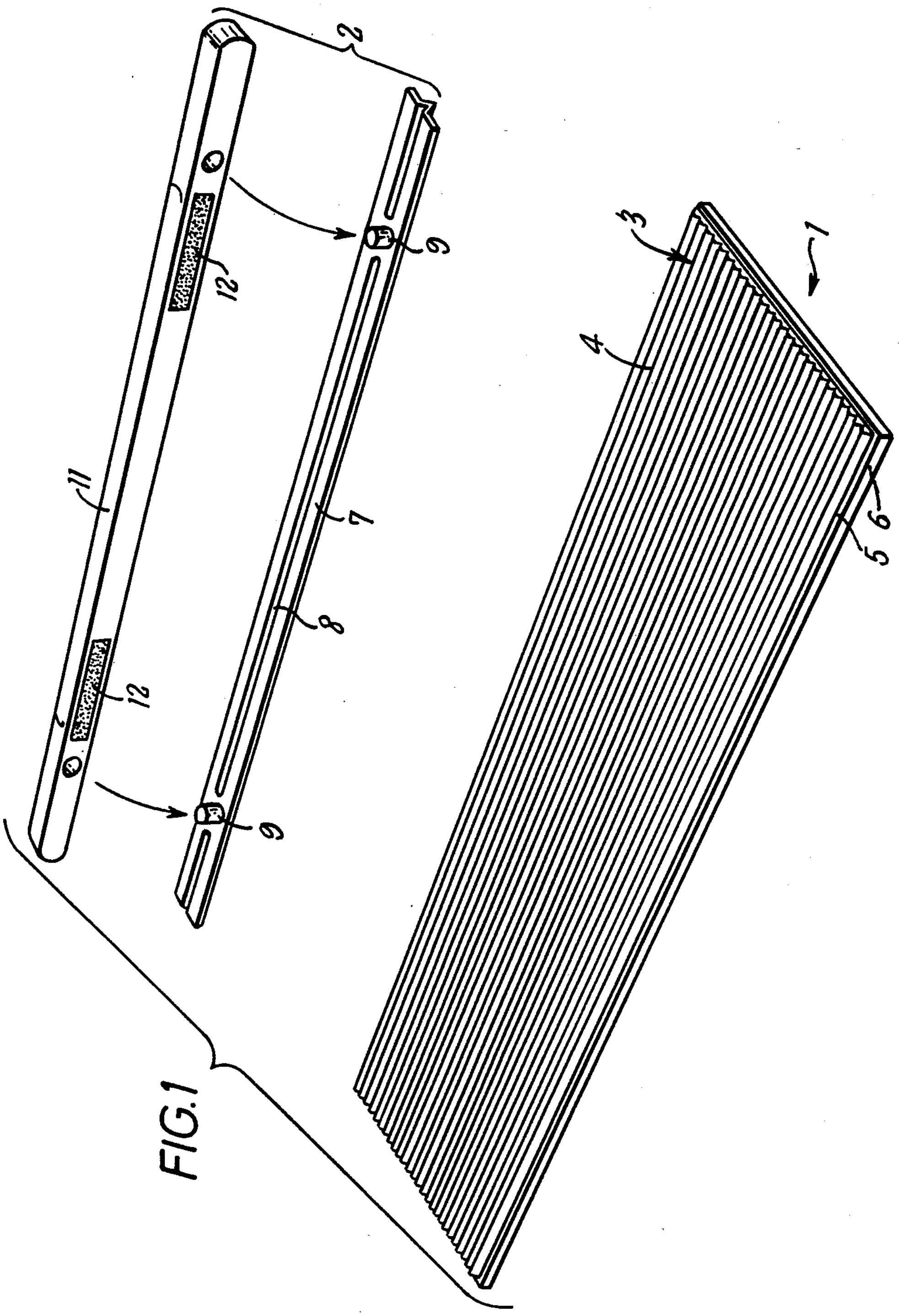
FIG. 1 is an exploded diagram of a kit of parts for use in applying transfer legends to desired surfaces.
Figure 2:
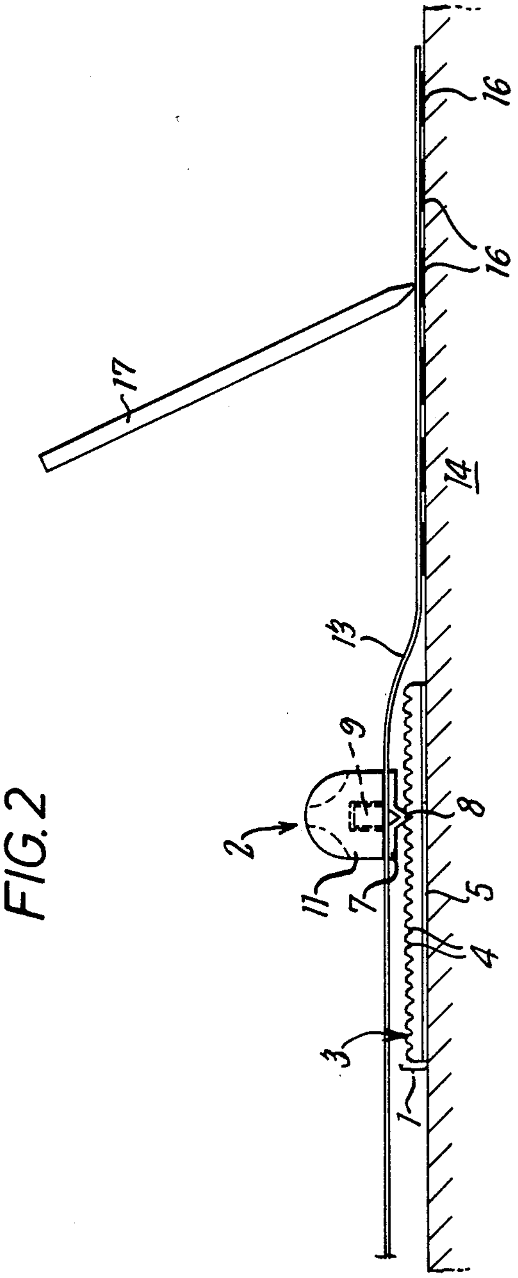
FIG. 2 is a cross-sectional view of the apparatus of FIG. 1 in use.

Referring to FIG. 1, the apparatus shown in this Figure consists of a base member 1 and a transfer sheet-holder 2. Base member 1 is a flexible slab consisting of a thermoplastic binder (e.g. plastic or rubbery material) in which particles of a fine magnetic powder (e.g. magnetized iron oxide, or barium ferrite particles) are dispersed and magnetically oriented and is of general dimensions about 13×50 cm and of thickness about 3 mm. Suitable flexible magnetic materials are available from the B.F. Goodrich Company, Akron, Ohio, as Koroseal ® magnets. Details on manufacturing flexible magnetic materials for use in the present invention are disclosed in U.S. Pat. Nos. 2,959,832 and 2,999,275, which disclosures are hereby incorporated by reference herein. A flexible 30 mm thick strip of Koroseal no. 62-264 containing barium ferrite particles is preferred for use in the invention as a base member material. (This has a four (4) pole polarity system—in which multiple magnetic poles run laterally and parallel along one or both faces of the Koroseal magnet.) The upper surface 3 of base member is made of siliconized polyethylene terephthalate sheet and has a number of parallel grooves 4 embossed therein and running from end to end of the sheet. The side of the sheet opposite grooves 4 is provided with a layer of permanently tacky pressure sensitive adhesive 5 which is normally covered by a protective siliconized card 6.

The transfer sheet-holding member 2 is a pin bar consisting of a steel bar 7 having on its base a rib 8 running the length of the bar 7. The top of bar 7 bears two register pins 9. A clamping bar 11 may be fitted over register pins 9 and clamped in place by magnetic force from two magnets 12 housed in the clamping bar.

In use a dry transfer sheet 13 having horizontally aligned rows of indicia (e.g. letters) 16 on its underside and having two perforations in it is first fitted on to pin bar 2 and held in place using the clamping bar 11.

The base member 1 is then attached to the surface 14 to which it is desired to apply a legend consisting of indicia. If it is desired to mark a steel cabinet or the like, sheet 6 is not removed and the base member simply holds there under its own magnetism. If the surface is one of some other nature, i.e., non-magnetic, then sheet 6 is peeled off to expose the adhesive 5 which is then used to adhere the base member to the desired surface temporarily.

The holder 2 with sheet 13 in it is then placed to bring the first dry transfer indicia or letter of the legend into the desired position with the rib 8 located in one of the grooves 4. The magnetic attraction between the two members and the fit of rib 8 in groove 4 make for a very stable and accurate connection. The groove profile being a "V" and the rib being round in section, wear is automatically compensated by the down force of the magnets. The horizontal position of the letter may be adjusted by sliding bar 7 and rib 8 along groove 4 and when the desired horizontal position is reached the first letter may be rubbed down e.g. using a stylus 17. Further letters are transferred in the same way, the bar 7 being moved to locate rib 8 in a different groove 4 when it is necessary to select a letter.

The accurate adjustment of the letters is guaranteed by virtue of the fact that each line of letters is accurately parallel to the remaining lines and accurately parallel to the rib 8. In addition, the vertical spacing between the lines is an integral multiple of the regular spacing between the grooves 4.

Figure 3:
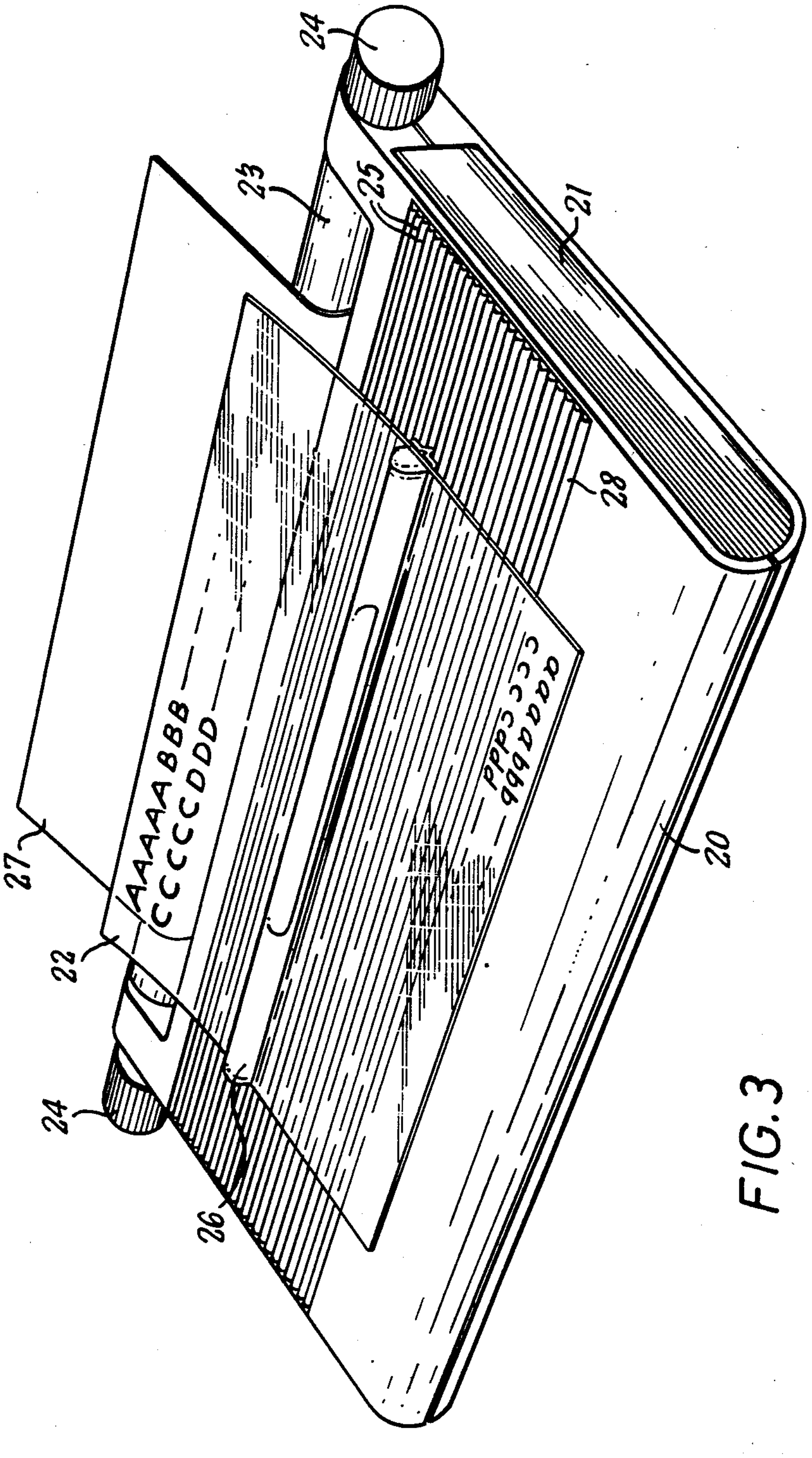
FIG. 3 is a perspective view of a desk top apparatus for applying legends to sheets of paper in accordance with the present invention in use.

Referring to FIG. 3, this shows a desk top unit consisting of a hollow box-like base 20, having a drawer 21 set in it for storage of sheets of dry transfer material 22. A roller 23 is mounted along one side of the box unit 20 and this can be turned by means of a knurled handle 24. Pawl and detent means may be provided (not shown in the drawing) to register the movement of the roller 23 in a fashion analogous to that of the roller on a typewriter carriage.

The upper surface of box 20 consists of a magentic sheet as in FIG. 1 having grooves 25 evenly spaced and accurately parallel to one another. A pin bar 26 of construction identical to that shown in FIG. 1 can be attached magnetically to the upper surface of the box unit 20 as shown with dry transfer sheet 22 extending therefrom. Successive letters are transferred on to a sheet of paper 27 which is fed round roller 23 as shown.

Figure 4:
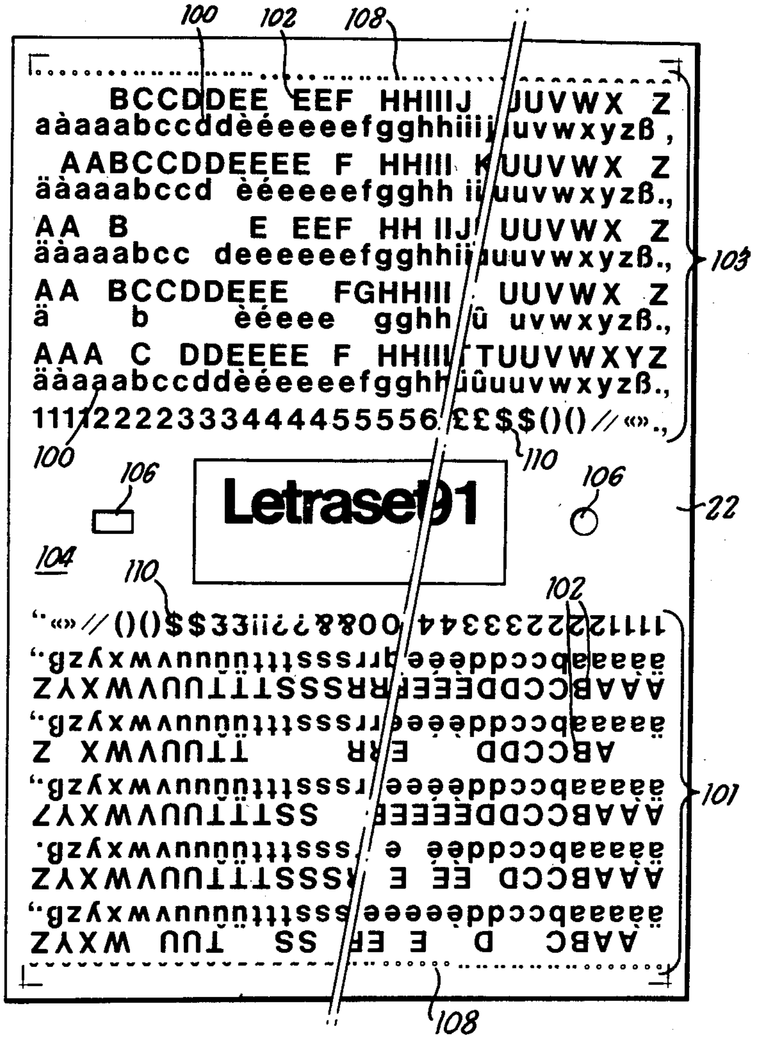
FIG. 4 is a view of a dry transfer sheet suitable for use in the apparatus of any of FIGS. 1 to 3 and 5 to 9.

The sheet format shown in FIG. 3 is one convenient type. As shown, one end of sheet 22 bears upper case letters and the other lower case letters, the two areas of lettering being separated by a blank strip running across the sheet, the blank strip including the two holes through which the register pins 9 pass when the sheet 22 is in the pin bar 26. An alternative, and preferred, arrangement of the symbols on the sheet is to provide on both ends of the sheet alternate lines of upper and lower case characters. Such a sheet is shown in FIG. 4. As can be seen the sheet has a plurality of horizontally aligned rows of lower case indicia 100, of upper case indicia 102, punctuation and like symbols 108 and numbers and other useful symbols 110. Between the two areas of indicia is a central region 104 in which two apertures 106 have been punched for the register pins 9 to pass through. As can be seen, the indicia on sheet 22 are in two spaced apart blocks or areas 101, 103, one being upside-down relative to the other. Each block is accurately spaced equidistantly from the central region 104, i.e. equally spaced from a line joining aperture 106, so that, when the sheet is mounted on a pin bar, as described above, the sheet may be rotated to bring the other of areas 101, 103 into use without loss of the horizontal alignment. In other words, if, in a part used sheet, the user is working from area 103 and finds, halfway through a word, that the next letter is no longer present in area 103, he may turn the sheet 180° to bring the letter needed into position, this time located in area 101.

The positioning of the two apertures 106 relative to the indicia rows must be very accurate in order that the rows run accurately parallel to the rib on the pin bar. The spacing between them is not so critical, and for this reason one aperture 106, the left hand one as shown in FIG. 4, may be elongated horizontally, as shown. Each aperture is vertically a friction fit over one of the pins 9. The dry transfer sheet 22 may be made by conventional methods well known for making such sheets, e.g. as described in U.S. Pat. Nos. 3,131,106, 3,212,913 and 4,177,308, the disclosures of all of which are specifically incorporated herein by such reference.

Figure 5:
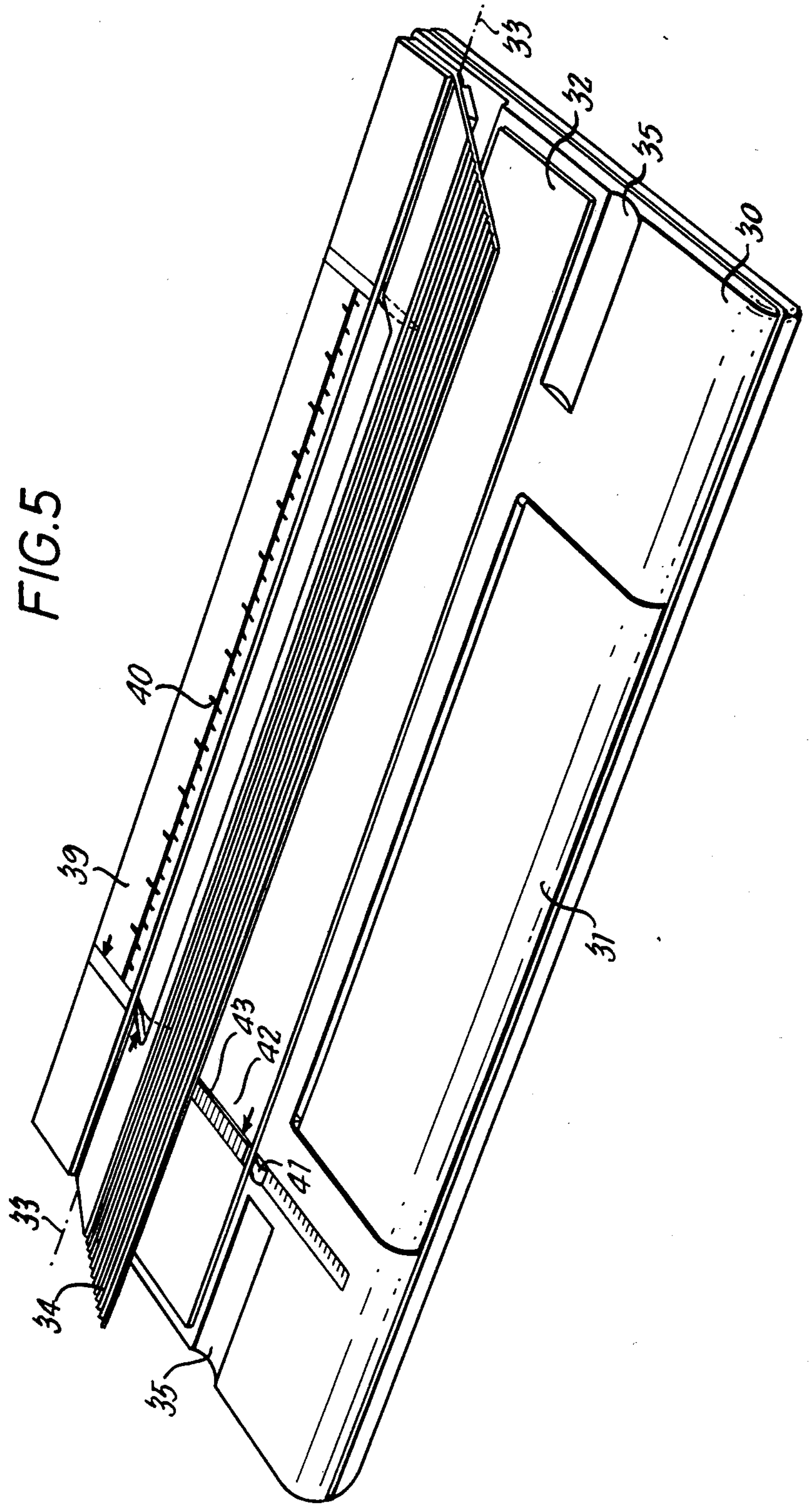
FIGS. 5 and 6 are views of the same apparatus prior to use and in use, being an alternative apparatus for applying legends to sheets of paper.
Figure 6:
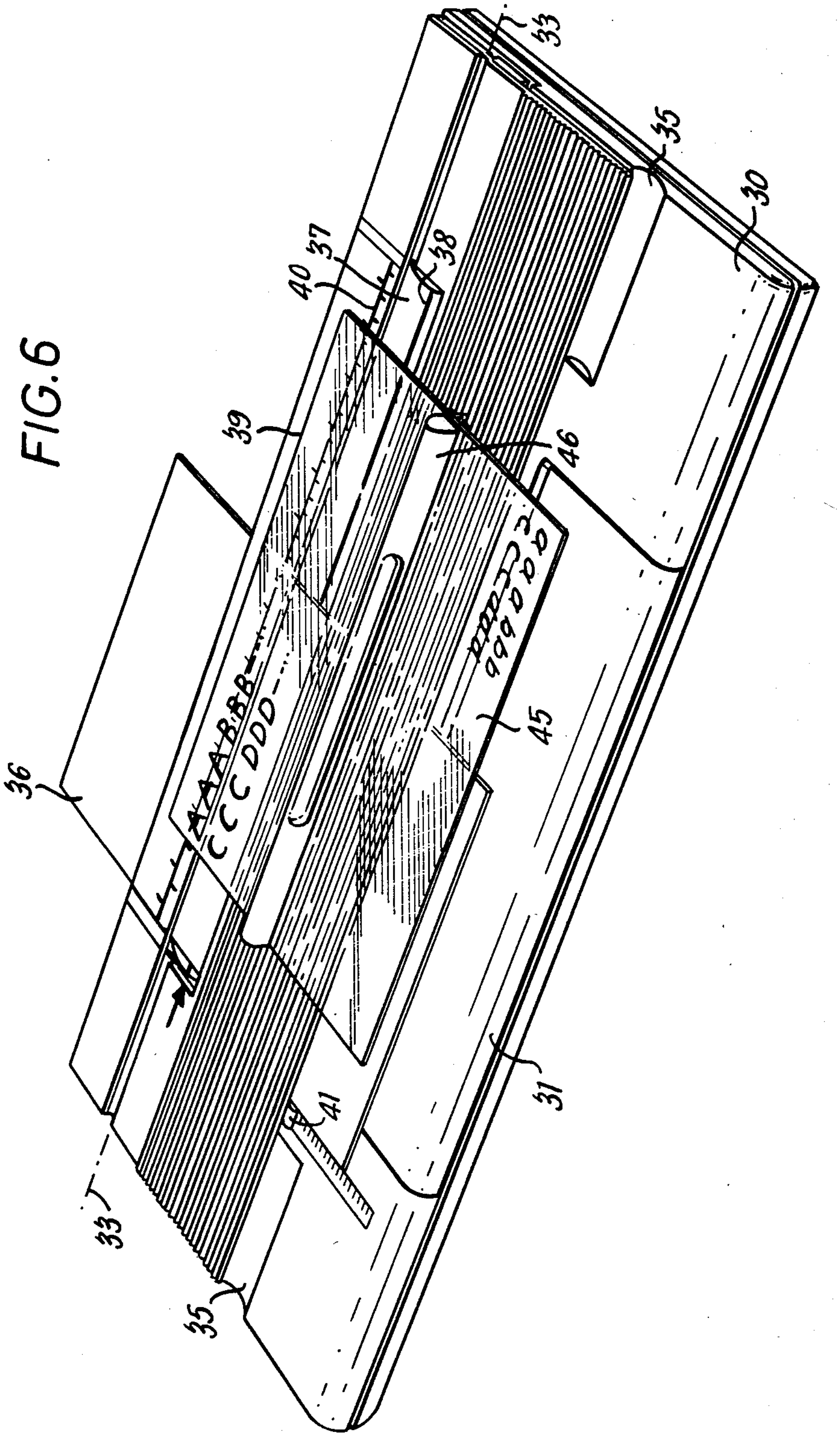

FIGS. 5 and 6 show a further embodiment. This consists of a generally hollow base member 30 the interior of which may be used to store sheets of dry transfer material. Access may be gained by means of a hinged flap 31.

Set into the upper surface of casing 30 is a rectangular slab 32 of plastics material filled with a plurality of magnetized iron oxide particles. Hingedly mounted about a hinge line 33 is an elongated ribbed surface magnetic member 34 which consists of a sheet of metal which is ferro-magnetic having a sheet of iron oxide filled plastics material on its surface, the outer surface of that sheet being evenly grooved. Magnetic attraction between slab 32 and the metal plate constituting part of flap 34 acts to clamp for example a sheet of paper 36 and hold it firmly in position. This clamping action can easily be released by lifting the ends of flap 34, which action is facilitated by the provision in the upper surface of casing 30 of two slight recesses 35 moulded therein.

Moulded in the upper surface of casing 30 is an upwardly convex working surface 37 having a dark black print line or alignment line 38 marked thereon. Line 38 is precisely parallel to the grooves in the top of flap 34. Spaced from the top of casing 30 and lying on the side of raised area 37 remote from flap 34 is a transparent bar 39 bearing a graduated scale 40 thereon. The mounting of bar 39 at its left hand end constitutes an abutment surface which together with a raised bead 41 acts to align the edge of sheet 36 precisely at right angles to the direction of line 38 and the grooves in flap 34. This provides a means of aligning sheet of paper 36 so that with its left hand edge vertical, a legend can be placed thereon precisely horizontal. The upper surface of slab 32 is likewise slightly depressed at 42 and has a vertical edge 43 impressed in it which is aligned with the end of bead 41 and the end of the space between bar 39 and the top of casing 30.

In use, flap 34 is first raised and a sheet of paper 36 slid in under it, over the top of raised area 37 and underneath bar 39. Thereafter a dry transfer sheet 45 on a holder 46 (of construction as described above) is placed as shown in FIG. 6. The relative distance between line 38 and the grooving on the top of flap 34 ensures that each of the lines of dry transfer lettering on sheet 45 can be brought to lie immediately above line 38. Using a stylus in conventional fashion dry transfer indicia or letters may be transferred successivly from sheet 45 onto paper sheet 36, the horizontal alignment being guaranteed.

Lateral positioning e.g. of titles at the centre of a page can be easily worked out using the scale 40 which may additionally have associated with it and printed on the bar 39 centre marks for standard paper sizes.

The device of FIGS. 5 and 6 may have a pair of simple foldaway legs located on its underside so that it may be kept relatively flat for storage but used in an inclined position on a desk, which is often more convenient for the user. To assist compact storage, there may be a suitable retaining means for bar 46 located underneath flap 31.

Figure 7:
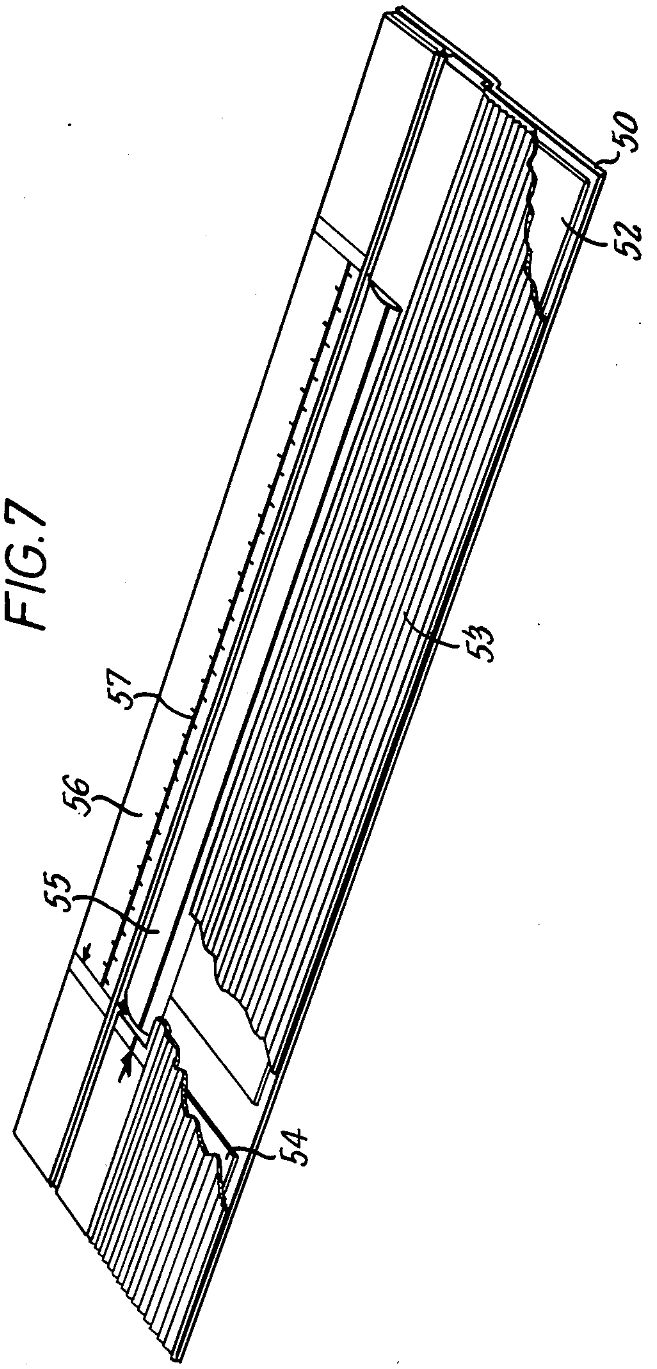
FIG. 7 is a perspective view of a simplified embodiment similar in some respects to that shown in FIGS. 5 and 6.

FIG. 7 shows a simplified version of the apparatus shown in FIGS. 5 and 6 where the casing 30 for storage is effectively dispensed with. It consists of a base sheet of plastics 50 having set thereon two slabs of magnetised material 52 and 54 which cooperate with a flap 53 entirely analogous in construction to flap 34 of the embodiment shown in FIGS. 5 and 6. There is likewise a raised convex support surface 55 and a transparent bar 56 bearing a scale 57 arranged as in the earlier embodiment. Support surface 55 can, if desired, be flat rather than convex. The right hand edge of the slab of magnetised material 54 as shown in FIG. 7 acts to align a sheet of paper onto which a legend accurately horizontally aligned can then be transferred. Flap 53 may be easily raised since it projects somewhat over the edge of base sheet 50.

Figure 8:
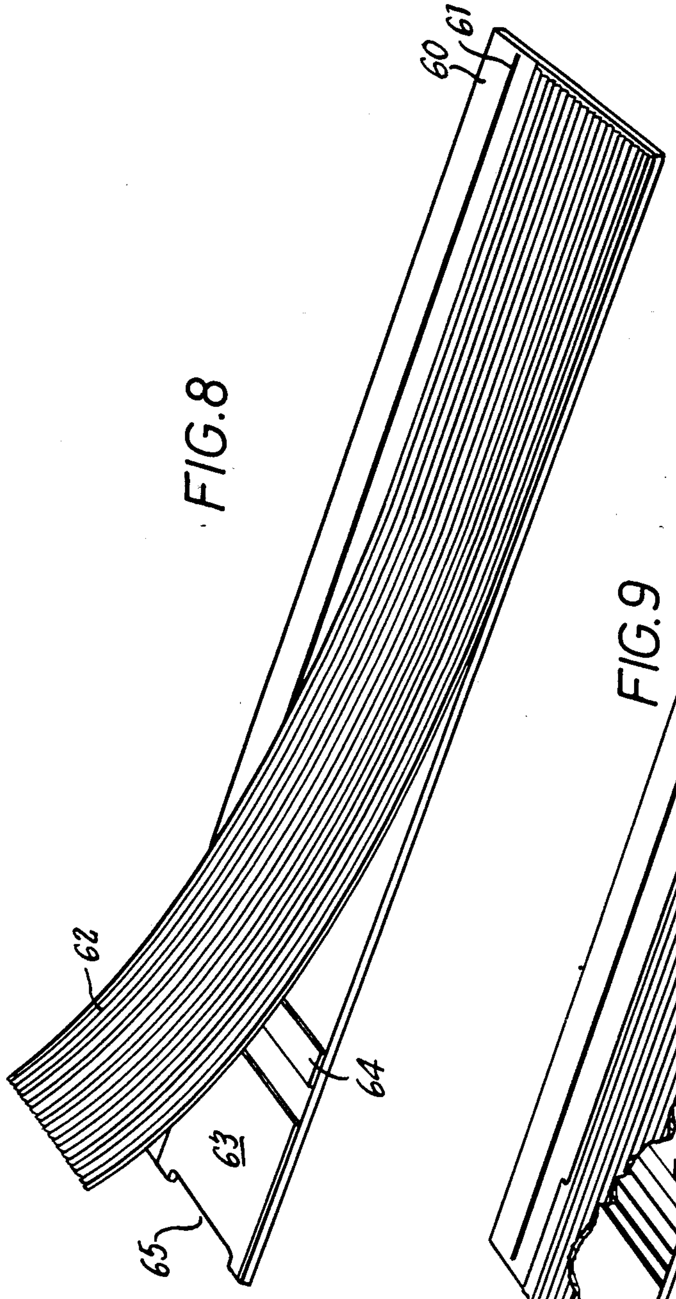
FIG. 8 is a perspective view of another simple embodiment of the invention.

FIG. 8 shows an even simpler embodiment consisting of a plastic base 60 having a horizontal print line 61 engraved and paint filled adjacent one edge. Adhered to the right hand end of base 60 as shown in FIG. 8 is a flexible strip 62 consisting of a thin metal ferro-magnetic sheet and an evenly spaced grooved iron oxide filled slab coextensive therewith. Set into the upper surface of base 60 at its left hand end are two pieces of magnetised iron oxide filled plastics material 63 and 64 which serve to hold the end of flap 62 down. The right hand edge of slab 63 runs accurately at right angles to the grooving in flap 62 and to line 61 and acts as a margin alignment for a sheet of paper which is placed between flap 62 and base 60. Flap 62 may be easily lifted from its left hand end due to a cut away portion 65 at the left hand edge of base 60. The apparatus is used with a dry transfer sheet set on a holder bar as described for previous embodiments.

Figure 9:
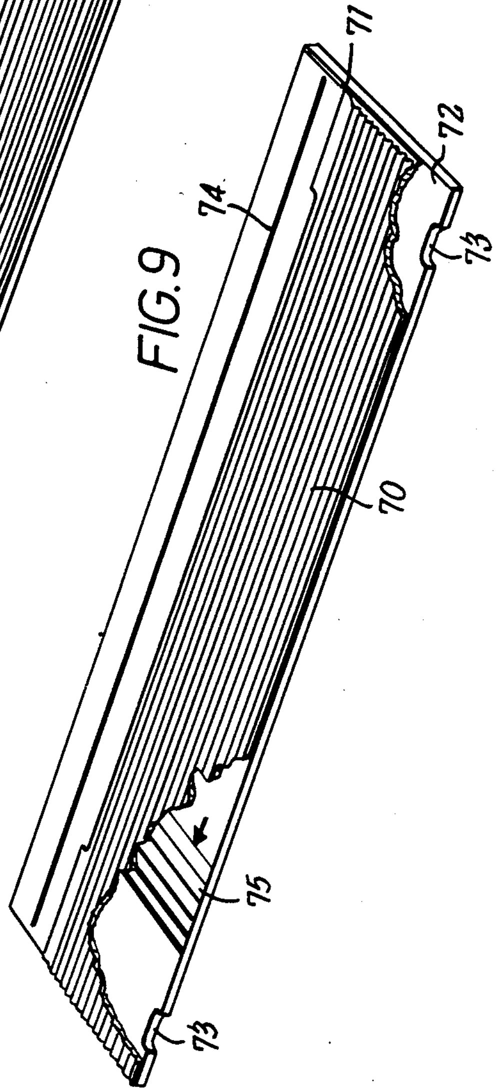
FIG. 9 is a perspective view, part cut away, showing a further simple embodiment of the invention.

FIG. 9 shows an alternative simplified version where a flap 70 consisting of a flexible sheet of ferromagnetic metal having a grooved plastic surface filled with magnetized iron oxide particles on one side, is hinged at 71 to a base member 72. Two cutouts at 73 in one edge of base member 72 enable flap 70 to be lifted whereon a sheet of paper may be placed between it and base 72 and clamped in position by letting the flap down. The sheet of paper extends on top of a heavily marked line 74 parallel to the grooving on the top of flap 70. A number of printed bars 75 on the top of base 72 can be used to align the sheet of paper with its left hand edge accurately at right angles to line 74. Thereafter with the sheet clamped in position, a legend may be applied using an assembly of a holding bar and dry transfer sheet as described above.

In the embodiments shown in FIGS. 8 and 9, the plane of the surface in which line 61 or 74 is set is preferably coplanar with or a little higher than a plane that is tangent to the top of the ridge on strip 62 or flap 70 when in operative position. This maintains the sheet of dry transfer material flat during use.

Referring to FIG. 10, the apparatus has a ribbed rubber member 80 on the upper face for use as in the embodiments described earlier. Using a pin bar and transfer sheet, letters are transferred onto a strip of absorbent paper 82, the strip being fed from a suitable cassette thereof 84 across a flat surface acting as a working area for making up a legend, e.g. a word or words. The word once transferred is moved on by means of a pair of pinch rollers 90 which are turned by means of a thumb-wheel 88, so that the portion of the strip passes under a cassette 86 which contains a strip of adhesive which is described in European Specification No. 0058066. The two strips then pass into a wetting station at which a spring loaded member 92 is used to press the two strips together and into contact with the exposed face of a water-impregnated sponge member 98. The water wets paper 82 and the member 92 is then released. The thumb-wheel 88 is then turned further to move the legend past an anvil 94 below which a cutter blade (not visible in the drawing) is mounted. The assembly of wet paper, dry transfer letters and adhesive web is shown emerging at 100. A lever 96 is then actuated to bring the blade up under the anvil 94 and the assembly can then be removed, wet paper strip 82 peeled off and discarded, and the legend rubbed down onto a desired final receptor surface where desired.

Referring to FIG. 11, the apparatus is constructed as a lidded box having a base 106 and a lid 104. Lid 104 carries a ribbed magnetic sheet 110 analogous to the sheet in the earlier described embodiments.

Adjacent sheet 110 is an area used to assemble a legend to form a label. The area includes a flat magnetic strip 112 having each side of it a raised land 114 with a groove in it. The two raised lands 114 are joined at one end by a raised land 116 which bears an alignment line 118 which acts as a baseline for a legend to be applied using a pin bar/dry transfer sheet assembly as described for use in earlier embodiments.

Base 106 accommodates in suitable slots a plurality of polytetrafluoroethylene-coated steel strips 120, and has bosses for receipt for storage of two rolls of adhesive tape 122, 124 and a recess for receipt of an adhesive tape dispenser 126.

Tape dispenser 126 has a reel of transparent or translucent tape inside it. The tape emerges at 128 between a pair of parallel flanges 130 and adjacent a cutter blade 132. As shown, the right hand side of the tape at 128 is the adhesive side.

Figure 12:
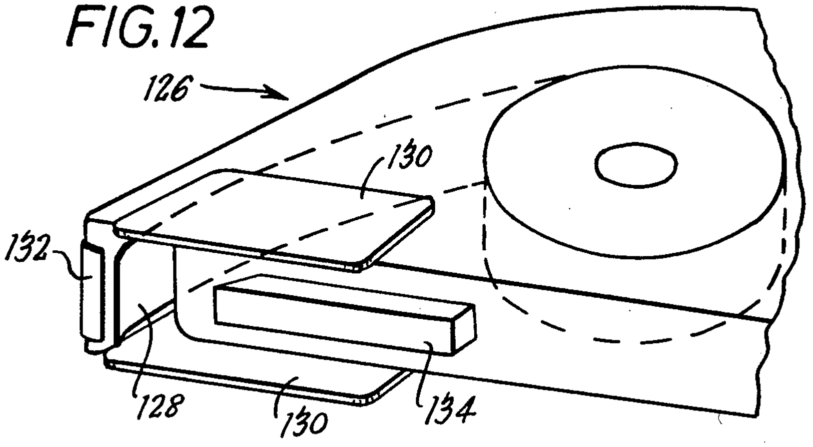
FIG. 12 is a perspective view of a tape cassette forming part of the apparatus of FIG. 11.

FIG. 12 shows the detail of the construction of the base of tape cassette 126. In order to assist in holding the cassette in proper position and alignment as it is slid along in grooves 114, a magnet 134 is mounted on the base of the cassette, suitably dimensioned to be firmly attracted to strip 112 when placed in position, but not to rub across the face of the exposed letters transferred to strip 120 during use of the device as noted below. Blade 132 can either be fixed as shown, or can be mounted on a suitable sliding member actuatable by a finger to bring it into a tape cutting position. The basic structure of the cassette is analogous to that described in U.S. Pat. No. 3,796,341, the disclosure of which is hereby expressly incorporated by reference.

The box is dimensioned so that it may also act as a storage box for sheets of dry transfer material of format as shown in FIG. 4 folded into two about a central horizontal line. To assist such folding the sheet may have a horizontal line of perforations at their center.

The box may thus be closed with all the equipment inside it for storage. For use, when it is desired to make a label or sign, the lid 104 is removed and placed with its far depending edge (i. e., the long edge nearer strip 112) resting in two slots 123 in the upper walls of base 106, and its other long edge resting, e. g., on the surface of a table on which base 106 also rests. The working upper surface of lid 104 is thus at a convenient slope, and the equipment necessary is accessible to the user.

To make a subsurface sign or label, the user takes a strip 120 and places it on strip 112 where it is held by magnetic attraction. If it is desired that the letters of the sign or label appear, e.g. on a white background, a piece of tape 124, for this purpose a white opaque adhesive tape, is then stuck onto strip 120.

A dry transfer sheet/pin bar assembly is then taken and used as described above to apply a legend to the section of tape 124 adhered to strip 120. The base-line of the legend is line 118. When the legend is complete, tape cassette 126 is taken and set at the left hand end of the top of the apparatus as shown in FIG. 11, with its flanges 130 aligned with the grooves in lands 114.

The cassette 126 is then slid to the right along the strip 120. First of all, flanges 130 enter the grooves in lands 114. Then the tape end at 128 catches on and adheres to land 116. As the cassette 126 is drawn to the right, it is held down by magnet 134 and kept straight by the flanges 130 running in grooves 114. During this movement, the tape is paid out, and simultaneously adhered to the legend on the tape strip on steel strip 120. Once past the end of the legend, cassette 126 is rotated anticlockwise as seen in the drawing whereupon blade 132 comes to bear on the tape and cuts it, leaving a short portion 128 projecting from the base of the cassette 126 as before. If the cassette has a cutter system, this is activated instead.

The right hand end of strip 120 is now raised by lifting the end with the fingers. This is facilitated by the fact that the strip 120 projects slightly past the right hand end of strip 112 as shown in the drawing, and there is a slight depression 121 in the lid 104 at this position. On detaching the strip 120 from magnetic strip 112, the section of adhesive tape is pulled from land 116. This section of tape projects over the end of strip 120, and thus constitutes a tab which can be easily grasped to peel the tape section from strip 120.

If desired, a number of such labels may be made up on a plurality of strips 120, and can then, if not desired to be used immediately, be replaced in base 106 and stored there for application later. A set of strips 120 can be placed on the final receptor surface and moved around to give the user an idea of what the final label or sign will look like, and e.g., to contrast different possible settings of the parts of a sign or layout before finally sticking all the parts down. Labels can be stored in this way for some time due to the inert nature of the polytetrafluoroethylene coating on the strips 120, which allows the tape and lettering to be peeled off cleanly, i.e., without leaving any adhesive residues, even if they have been left adhered thereto for days.

When it is desired to apply the tape, it may be peeled off strip 120 by hand and then positioned and applied. Alternatively, strip 120 may be placed on the receptor surface, the projecting tab of adhesive tape pressed down to adhere to that surface, and the strip 120 then rotated through 180° about its left hand end and moved to the right to peel the tape off and stick it down onto the receptor surface.

Once so applied, the legend is protected by the piece of tape from cassette 126, but shows up clearly against the white background tape 124. If the receptor surface and legend contrast adequately, the tape 124 may be omitted. If it is desired to highlight part of the message or, e.g., have black letters appear on a colored background, the tape in cassette 126 may be a colored translucent tape. Applied on a white ground, a legend of black lettering then shows up against a rectangular colored background corresponding to the piece of tape.

The apparatus of FIGS. 11 and 12 may be particularly compact. Because of the relatively small target area onto which letters are to be transferred, effectively the area of strip 112, the overall size may be reduced compared to that of the apparatus of, e.g., FIGS. 3, 5 and 10, without becoming impractical in use.

The specific types of apparatus described above incorporate a variety of different features. Within the scope of the present invention are encompassed apparatus having different combinations of such features, and also apparatus having interchangeable parts to give added flexibility. For example, the section of the apparatus shown in FIGS. 5 and 6 and including working surface 37 and bar 39 may be constructed as a snap-in unit which may be detached and replaced, e.g., with a paper strip cassette support system for use in the process described in the European Patent Specification No. 0058066.

Figure 13:
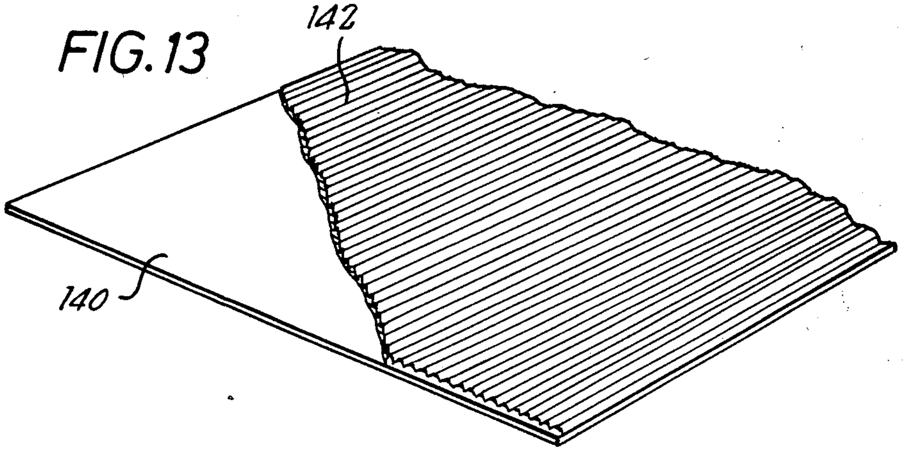
FIG. 13 is a view, part cut away, of a magnetic device according to the invention.
Figure 14:
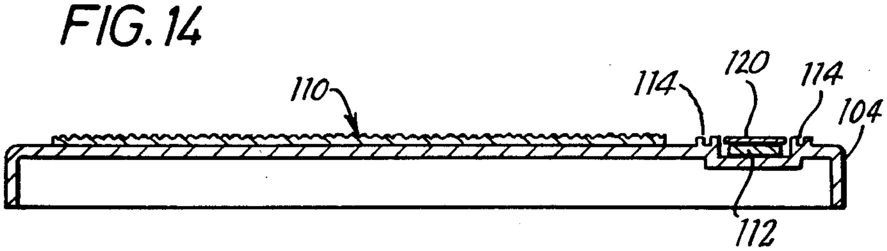
FIG. 14 is a section along lines A—A of FIG. 11 showing the device in use.

FIG. 13 shows a magnetic device according to the invention. It consists of a steel sheet 140, 0.5 mm thick, having adhesively laminated thereto a layer of magnetic iron oxide filled rubbery plastics material 142. The surface of material 142 has been deformed by embossing into a set of accurately parallel, accurately evenly spaced grooves and ridges. The grooves are V-shaped in cross-section and the ridges rounded. During such embossing, a sheet of silicone coated polyethylene terephthalate was interposed between the embossing die and the material 142, and this becames hot welded to the surface of material 142 thereby. Alternatively, the surface can be direct siliconized. A typical composition for material 142 is a cured rubber containing iron oxide. Such materials are available in commerce, e.g., from the B. F. Goodrich Company, Akron, Ohio, under the designations Koroseal® no. 62-264.

We claim:

1. Apparatus for use in connection with a dry transfer sheet which consists of a base member and a sheetholder member, the sheet-holder member being in the form of an elongated bar having means on one side for attaching a sheet of dry transfer material thereto and its other side being substantially flat and having a rib projecting therefrom and running along the length of the bar, the base member comprising a magnetized material and having a series of evenly spaced parallel grooves therein the longitudinal extent of the grooves being at least as long as the bar, the two members being magnetically attracted one to the other, at least one of such members being permanently magnetized.

2. Apparatus according to claim 1 wherein the apparatus comprises a roller for supporting a sheet of paper, and connected thereto a support panel extending from one side of the roller, the plane of the surface of the support panel being tangential to the roller, and the base member of the apparatus of the invention being formed as, or set into, the support panel with its grooves running parallel to the axis of the roller.

3. Apparatus according to claim 1 wherein the base member is a relatively flexible sheet of magnetised plastics material which may be temporarily attached to a surface on to which it is desired to transfer a legend.

4. Apparatus according to claim 1 wherein the base member includes a convex part cylindrical section adjacent the grooves and adapted to support a sheet of paper or like material onto which a legend is to be applied from a dry transfer sheet.

5. Apparatus according to claim 1 wherein the base member is provided on its ungrooved side with a permanently tacky adhesive layer which will serve temporarily to attach the base member to a desired surface.

6. Apparatus according to claim 1 wherein the transfer sheet-holder member bears transfer sheet-holding means thereon including register pins over which a pre-punched dry transfer sheet may be fitted.

7. Apparatus according to claim 1 wherein the surface of the base member facing the transfer holding member is faced with a sheet of relatively low friction material.

8. Apparatus according to claim 1 and further including, adjacent the grooves on the base, a track of two rails, means for locating between the rails an image receiving member, and an adhesive-tape containing cassette adapted to run in the track and to apply adhesive tape onto the surface of an image receiving member located between the rails.

9. Apparatus according to claim 8 wherein the image receiving member is a magnetic strip having a high release surface onto which a legend can be temporarily transferred from a dry transfer sheet.

10. Apparatus according to claim 1 and including means for feeding a strip of paper tape past a location adjacent the grooves on the base, means for receiving a cassette of adhesive tape, a station at which the paper tape and adhesive tape may be brought together to form an assembly, means for applying a liquid to the paper tape in such an assembly, and means downstream of the station, for cutting a portion of said assembly from the remainder of the paper and adhesive tapes.

11. A dry transfer letter positioning system comprising:

a flexible light transmitting carrier sheet, a plurality of indicia arrayed in two groups of vertically spaced apart horizontal rows on said carrier, a first group of said indicia rows arrayed on one portion of said sheet in right reading order, a transverse alignment zone on said sheet in horizontal alignment with said indicia rows, a second group of said indicia rows arrayed on said sheet and spaced apart from said first group by said alignment zone, each of said indicia in said second group being positioned upside down with respect to the indicia in said first group of indicia rows, at least two spaced apart perforations in said sheet along said alignment zone, a horizontal alignment device comprising upper and lower mating bars, said upper bar being located in contact with a top surface of said carrier sheet and along said alignment zone, said lower bar in contact with the lower surface of said carrier sheet along said alignment zone, a pair of spaced apart locating members on said lower bar for engaging in receiving means in said upper bar through the perforations in said sheet, and means for holding said alignment bars in contact with said respective upper and lower sheet surfaces, whereby said indicia rows are maintained in a fixed horizontal alignment with the longitudinal axis of said device.

12. Apparatus for holding a dry transfer sheet in fixed horizontal alignment with an underlying parallel-grooved receiving surface comprising a first horizontal bar including spaced apart apertures in one surface thereof and a piece of magnetic material adjacent each of said apertures, a second horizontal bar member comprising ferromagnetic material, and including spaced apart male members shaped to fit within the apertures in said first bar, said second bar including a longitudinal raised rib on the side away from said first bar whereby said bar can be positioned in a horizontal groove on said underlying receiving surface to align dry transfer indicia on said sheet with a receiving surface.

* * * * *